US011430080B2

(12) United States Patent
Narasiman et al.

(10) Patent No.: US 11,430,080 B2
(45) Date of Patent: Aug. 30, 2022

(54) METHODS AND APPARATUS FOR SPECULATIVE EXECUTION OF FRAGMENTS IN A GRAPHICS PIPELINE

(71) Applicant: Samsung Electronics Co., Ltd., Suwon-si (KR)

(72) Inventors: Veynu Narasiman, Austin, TX (US); David Tannenbaum, Austin, TX (US); Keshavan Varadarajan, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/931,435

(22) Filed: Jul. 16, 2020

(65) Prior Publication Data

US 2021/0358072 A1 Nov. 18, 2021

Related U.S. Application Data

(60) Provisional application No. 63/025,971, filed on May 15, 2020, provisional application No. 63/029,399, filed on May 22, 2020.

(51) Int. Cl.
*G06T 1/20* (2006.01)
*G06T 15/00* (2011.01)
*G06T 15/80* (2011.01)

(52) U.S. Cl.
CPC ............... *G06T 1/20* (2013.01); *G06T 15/005* (2013.01); *G06T 15/80* (2013.01)

(58) Field of Classification Search
CPC ......... G06T 1/20; G06T 15/005; G06T 15/40; G06T 15/405; G06T 15/80
USPC .................................................. 345/421, 422
See application file for complete search history.

(56) References Cited

U.S. PATENT DOCUMENTS

| 6,023,745 | A  | * | 2/2000  | Lu ....................... G06F 12/0215 |
|           |    |   |         | 711/149 |
| 8,860,721 | B2 |   | 10/2014 | Gruber et al. |
| 10,417,815 | B2 |  | 9/2019  | Pillai et al. |
| 2018/0349315 | A1 | * | 12/2018 | Heggelund ......... G06F 15/7882 |
| 2019/0108610 | A1 |   | 4/2019  | Flordal et al. |
| 2019/0259193 | A1 |   | 8/2019  | Harris et al. |
| 2021/0065437 | A1 | * | 3/2021  | Brkic ...................... G06T 11/40 |

* cited by examiner

Primary Examiner — Jacinta M Crawford
(74) Attorney, Agent, or Firm — Renaissance IP Law Group LLP (57) ABSTRACT

A method of executing an early-Z draw call in a graphics processing pipeline may include detecting a late-Z draw call in the pipeline, determining a compatibility of a depth comparison function of the early-Z draw call with a depth comparison function of the late-Z draw call, and speculatively executing a fragment of the early-Z draw call with a shader. The method may further include determining that the fragment of the early-Z draw call passes the depth comparison function of the early-Z draw call, and updating a depth buffer with a depth value for the fragment of the early-Z draw call. The method may further include determining that the fragment of the early-Z draw call provides a correct result, and forwarding the speculative shader result for the fragment to a next stage of the pipeline.

22 Claims, 7 Drawing Sheets

METHODS AND APPARATUS FOR SPECULATIVE EXECUTION OF FRAGMENTS IN A GRAPHICS PIPELINE

CROSS-REFERENCE TO RELATED APPLICATIONS

This application claims priority to, and the benefit of, U.S. Provisional Patent Application Ser. No. 63/025,971 titled "Method and Apparatus for Efficient Speculative and Out-Of-Order Fragment Shader Execution" filed May 15, 2020 which is incorporated by reference, and U.S. Provisional Patent Application Ser. No. 63/029,399 titled "Method and Apparatus for Efficient Speculative and Out-Of-Order Fragment Shader Execution" filed May 22, 2020 which is incorporated by reference.

TECHNICAL FIELD

This disclosure relates generally to graphics processing pipelines, and more specifically to speculative execution of fragments in a graphics processing pipeline.

BACKGROUND

A graphics processing pipeline may render a 3-dimensional image by processing fragments of primitives in a scene. Some pipelines may support depth testing to determine the visibility of fragments in 3-dimensional space. If a fragment is occluded (hidden) by a fragment of a different primitive, the pipeline may discard the occluded fragment to prevent it from being rendered to the scene.

The above information disclosed in this Background section is only for enhancement of understanding of the background of the invention and therefore it may contain information that does not constitute prior art.

SUMMARY

A method of executing an early-Z draw call in a graphics processing pipeline may include detecting a late-Z draw call in the pipeline, determining a compatibility of a depth comparison function of the early-Z draw call with a depth comparison function of the late-Z draw call, and speculatively executing a fragment of the early-Z draw call with a shader. The method may further include determining that the fragment of the early-Z draw call passes the depth comparison function of the early-Z draw call, and updating a depth buffer with a depth value for the fragment of the early-Z draw call. The method may further include determining that the fragment of the early-Z draw call provides a correct result, and forwarding the speculative shader result for the fragment of the early-Z draw call to a next stage of the pipeline. Determining that the fragment of the early-Z draw call provides a correct result may include determining that the late-Z draw call did not modify the depth buffer for the fragment. The method may further include tracking the fragment of the early-Z draw call with a speculative buffer. The method may further include determining that the fragment of the early-Z draw call has been speculatively executed. The method may further include adjusting the depth comparison function of the late-Z draw call. The method may further include determining that the depth comparison function of the late-Z draw call comprises less-than or greater-than. The method may further include modifying the depth comparison function of the late-Z draw call to include equal-to. Detecting the late-Z draw call in the pipeline may include tracking one or more outstanding late-Z draw calls. The one or more outstanding late-Z draw calls may be tracked by depth comparison functions.

A method may include tracking a pixel location in a graphics processing pipeline, detecting an early-Z fragment and a late-Z fragment for the pixel location, determining a compatibility of a depth comparison function of the early-Z fragment with a depth comparison function of the late-Z fragment, and speculatively executing the early-Z fragment for the pixel location with a shader. The pixel location may be tracked with a scoreboard that stores a draw call type and a depth comparison function for one or more fragments at the pixel location. The scoreboard may include a cache-like structure. Entries in the cache-like structure may be indexed (e.g., by a hash function) by one or more pixel coordinates. The method may further include determining that the early-Z fragment passes the depth comparison function of the early-Z fragment, and updating a depth buffer with a depth value for the early-Z fragment. The method may further include determining that the early-Z fragment provides a correct result, and forwarding the shader result for the early-Z fragment to a next stage of the pipeline.

A graphics processing unit may include a pipeline including a shader unit, a depth test unit arranged to receive data from a rasterizer and the shader unit and send data to the shader unit and a next stage of the pipeline, and a logic unit coupled to the shader unit and the depth test unit and configured to detect an early-Z draw call and a late-Z draw call in the pipeline, determine a compatibility of a depth comparison function of the early-Z draw call with a depth comparison function of the late-Z draw call, and control the shader unit to speculatively execute a fragment of the early-Z draw call. The graphics processing unit may further include a speculative buffer configured to track one or more speculatively executed fragments. The graphics processing unit may further include a scoreboard configured to store a draw call type (i.e., early-Z draw call or late-Z draw call) and a depth comparison function for one or more draw calls for a fragment. The logic unit may be further configured to control the depth test unit to determine that the fragment of the early-Z draw call passes the depth comparison function of the early-Z draw call, and update a depth buffer with a depth value for the fragment of the early-Z draw call. The logic unit may be further configured to determine that the fragment of the early-Z draw call provides a correct result, and control the shader unit to forward the speculative result for the fragment of the early-Z draw call to a next stage of the pipeline.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments disclosed herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

DETAILED DESCRIPTION

Overview

This disclosure encompasses numerous inventive principles relating to transitioning from late-Z to early-Z draw calls in a graphics pipeline. These principles may have independent utility and may be embodied individually, and not every embodiment may utilize every principle. Moreover, the principles may also be embodied in various combinations, some of which may amplify the benefits of the individual principles in a synergistic manner.

Some of the inventive principles involve speculative execution of fragment shading which may enable fragments to be executed out of order, thereby reducing or preventing pipeline stalls. In some embodiments, speculative execution may be based on the compatibility of the depth comparison functions for a newer early-Z draw call and an outstanding (i.e., currently being processed) late-Z draw call. For example, for some combinations of early-Z and late-Z depth comparison functions, the order of the depth tests for the early-Z draw call and the late-Z draw calls may not alter the final depth value for the fragment. Thus, one or more fragments for the early-Z draw call may be speculatively executed (e.g., speculatively shaded) before the late-Z draw call is complete. In some embodiments, one or more checks for correctness may be implemented to determine if the speculative execution of the early-Z draw call would lead to incorrect results in the render targets before committing the output of the speculative shading for further processing. In some embodiments, correctness may refer to ensuring that the intended result of an order of operation and/or depth test specified by an application programming interface (API) for the pipeline is achieved.

Some additional inventive principles relate to techniques for ensuring functional correctness of results (e.g., correct depth value and/or color value for a fragment) after speculative execution of a fragment. Some embodiments may implement various techniques such as post-shader testing of depth values, tracking of speculatively executed fragments within a draw call, dynamic modification of a depth comparison function for a late-Z draw call, and/or other techniques and/or combinations thereof. For example, even if, for a specific combination of early-Z and late-Z depth comparison functions, the order of the depth tests may not alter the final depth value for the fragment, the order of the early-Z and late-Z draw calls may still affect the correct color value for the fragment. Therefore, a post-shader operation for the early-Z draw call may discard the results (e.g., color value) of the speculative execution of a fragment if it determines that the late-Z draw call has updated the depth and/or color values for the fragment. As used herein, the term color may refer to anything that may be output from a speculative execution such as color, texture, and/or the like.

Some additional inventive principles relate to techniques for tracking speculative execution of fragments on a draw call basis. For example, outstanding late-Z draw calls may be tracked on the basis of their depth comparison functions. The depth comparison function of an incoming early-Z draw call may then be checked for compatibility with the depth comparison functions of all outstanding late-Z draw calls. If the depth comparison function of the incoming early-Z draw call is compatible with the depth comparison functions of the outstanding late-Z draw calls, fragments of the incoming early-Z draw call may be speculatively executed. Otherwise, the pipeline may be stalled. Moreover, one or more speculative buffers may be used to track which fragments within a draw call are speculatively executed.

Some additional inventive principles relate to techniques for tracking fragment execution on a per-pixel basis. For example, some embodiments may implement a scoreboard to track outstanding pixels in the pipeline. In some embodiments, a pixel and a fragment may both refer to an (x,y) location. If fragments of a second draw call occupy the same pixel locations as fragments from a first draw call that are still in flight, one or more compatibility criteria may be used to determine the order in which fragments from the different draw calls may be allowed to execute. Some embodiments may combine per-pixel tracking with speculative execution. For example, if there is an incoming early-Z fragment at a specific pixel location where there is also an outstanding late-Z fragment, some embodiments may implement a compatibility test and speculatively execute the early-Z fragment if the depth comparison function of the incoming early-Z fragment is compatible with the depth comparison function of the outstanding late-Z fragment.

Depth Testing

In some embodiments, fragments may have associated depth values, also referred to as Z-values, which may be used during depth testing to determine the visibility of fragments in 3-dimensional space. During a depth test, the depth value of a fragment may be tested against the depth value stored in a corresponding location in a depth buffer. If the fragment fails the depth test, the fragment may be discarded because it may indicate that the fragment is occluded by another fragment having the depth value stored in the depth buffer (e.g., a fragment belonging to a different primitive). If the fragment passes the depth test, its depth value may be used to update or overwrite the corresponding value in the depth buffer, and the fragment may proceed through the pipeline as described in more detail below.

A depth test may be performed using a comparison function that may be specified, for example, by an application using the pipeline. Examples of depth comparison functions include less-than (LT), less-than-or-equal-to (LE), greater-than (GT), greater-than-or-equal-to (GE), and others described below. A fragment may pass a depth test if it satisfies the comparison function as applied to the depth value stored in the corresponding location in the depth buffer. For example, if the depth comparison is LE, a fragment may pass the depth test if the depth value of the fragment is less than or equal to the value stored in the depth buffer.

In some embodiments, a pipeline may support both early-Z and late-Z depth tests. An early-Z depth test may be performed on a fragment, for example, after rasterization but before the fragment is processed by a fragment shader, whereas a late-Z depth test may be performed after fragment shading. Performing an early depth test may prevent unnecessary work by a fragment shader or other stage of the pipeline on a fragment that may not be visible in the final image. However, the ability to perform an early-Z depth test may depend on when the depth value for a fragment is known, which may occur at different stages in a graphics processing unit (GPU) pipeline.

The depth values for some fragments may be determined by interpolating the depth values of the vertices of a primitive to which the fragment belongs. The depth values of these fragments may be known immediately after rasterization, and therefore, these fragments may be tested with an early-Z depth test. If a fragment fails an early-Z depth test it may be discarded rather than being sent to a fragment shader, thereby reducing processing time, energy dissipation, memory accesses, and/or the like. If the fragment passes the early-Z depth test, the fragment may be marked as visible, the corresponding location in the depth buffer may be updated or overwritten with the depth value of the fragment, and/or the fragment may be forwarded to a subsequent stage in the pipeline, which may be, for example, a fragment shader.

For some fragments, however, their depth values may not be determined until after they are processed by a fragment shader. For example, some draw calls may configure the fragment shader to modify the depth values of one or more fragments. Thus, these fragments may be tested with a late-Z depth test. As with an early-Z depth test, fragments failing a late-Z depth test may be discarded, while the depth values of fragments passing a late-Z depth test may be used to update the depth buffer.

After fragment shading, the shader output values (e.g., color values) for fragments that survived early-Z or late-Z depth testing may be saved to memory and/or forwarded to a subsequent stage in the pipeline such as, for example, a raster operation unit (ROP).

Figure 1:
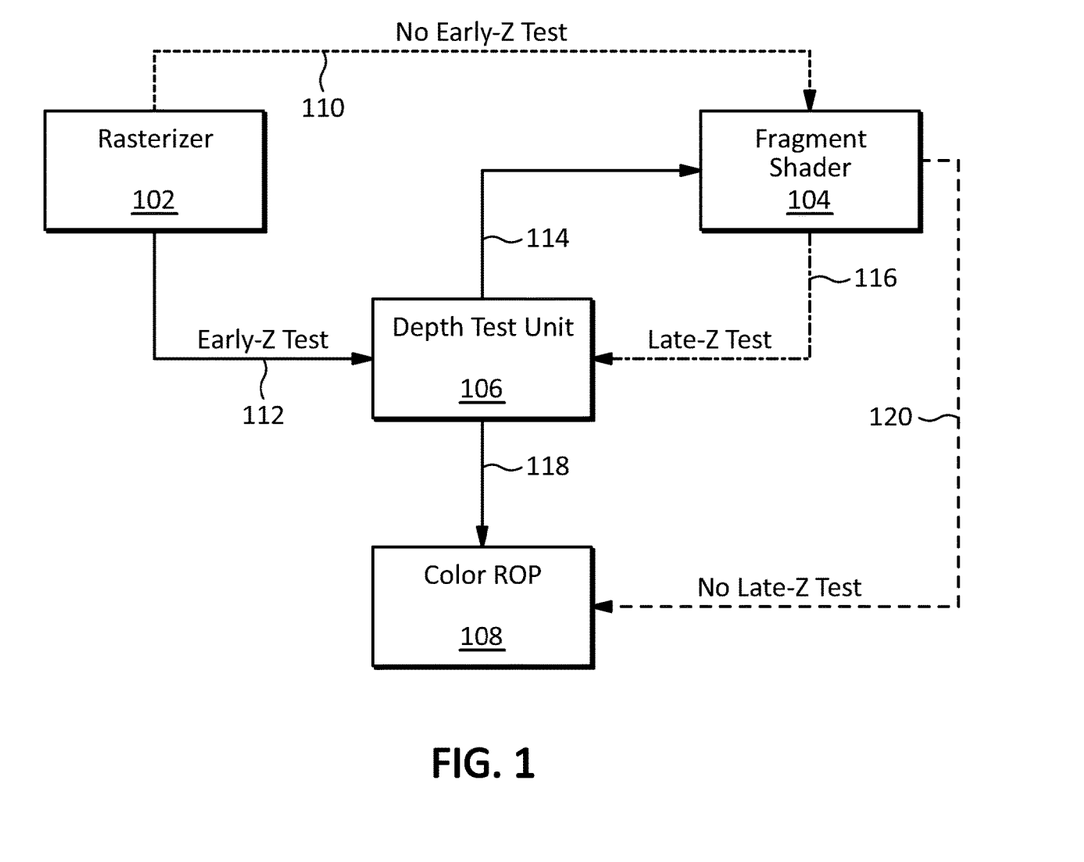
FIG. 1 illustrates data flow between components of an embodiment of a GPU pipeline according to this disclosure.

FIG. 1 illustrates data flow between components of an embodiment of a GPU pipeline according to this disclosure. The embodiment illustrated in FIG. 1 may include a rasterizer 102, a fragment shader 104, a depth test unit 106, and a color ROP unit 108. The particular paths taken by any specific data may depend on factors such as the type and/or order of various testing used for each draw call. For example, data may flow from the rasterizer 102 to the fragment shader 104 along path 110 if an early-Z depth test is not enabled. If an early-Z depth test is enabled, data may flow from the rasterizer 102 to the depth test unit 106 through data path 112. Fragments passing the depth test may then flow from the depth test unit 106 to the fragment shader 104 along data path 114, whereas fragments failing the depth test may be discarded. After the execution of the fragment shader 104, if a late-Z depth test is enabled, the fragments may be sent to the depth test unit 106 through data path 116. Fragments that survive the late-Z depth test may be forwarded to the color ROP 108 through data path 118. Alternatively, if a late-Z depth test is not enabled, the data from the fragment shader 104 may be forwarded directly to the color ROP 108 through data path 120, thus bypassing the depth test unit 106.

Thus, in some embodiments, one or more fragments may traverse the components illustrated in FIG. 1 in one or more of the following manners: (1) some fragments may not undergo either early-Z or late-Z depth tests, for example, when both depth tests are disabled; (2) some fragments may be subjected to an early-Z depth test but not a late-Z depth test; (3) some fragments may be subjected to a late-Z depth test but not an early-Z depth test, for example when the fragment shader may modify the depth value for the fragments; and (4) some fragments may be subjected to both the early-Z and late-Z depth tests. In some embodiments, when fragments are subjected to both the early-Z and late-Z depth tests, the depth buffer may be modified in the late-Z stage of the pipeline, and the early-Z test may be used to opportunistically eliminate work for the fragment shader.

In some embodiments, any of the operations performed in a GPU pipeline, including the components illustrated in FIG. 1, may be performed at any level of granularity.

The components and data flow illustrated in FIG. 1 may be describing logical data flow and/or component arrangements. In some embodiments, the specific hardware and/or software implementations may be different, even though it may produce the same results.

In some embodiments, all fragments within a draw call may use the same depth comparison function and or type of depth test (e.g., early-Z or late-Z). Thus, in some embodiments the depth comparison function and/or type of depth test may only change at draw call boundaries.

For convenience, a draw call on which an early-Z depth test is enabled may be referred to as an early-Z draw call, and a draw call on which a late-Z depth test is enabled may be referred to as a late-Z draw call. Similarly, a fragment of a draw call on which an early-Z depth test is enabled may be referred to as an early-Z fragment, and a fragment of a draw call on which a late-Z depth test is enabled may be referred to as a late-Z fragment.

In some embodiments, both early-Z and late-Z draw calls may modify a shared depth buffer. Thus, some form of synchronization may be implemented, for example, to maintain functional correctness. In some embodiments, the use of a single depth test unit may enable the methods and/or apparatus disclosed herein to maintain correctness.

Late-Z to Early-Z Transition

In some embodiments, a GPU pipeline may perform depth tests in draw and primitive order, for example, as specified by an application, to ensure functional correctness. However, in some embodiments, a potential problem with performing both early-Z and late-Z depth tests in the same pipeline, is that it may change the order of depth tests for fragments at the same pixel location in different draw calls, thereby causing incorrect results. For example, a late-Z draw call may be outstanding in the pipeline when a new early-Z draw call enters the pipeline. If both of these draw calls process fragments for the same pixel, the depth test unit may perform a depth test for a fragment in the early-Z draw call before performing a depth test for a fragment for the same pixel in the late-Z draw call, which may produce incorrect results.

Some embodiments may ensure correctness by stalling the pipeline when transitioning from a late-Z draw call to an early-Z draw call. For example, a pipeline may be stalled at a draw call boundary by waiting for depth testing for fragments of the outstanding late-Z draw call to be completed before performing depth testing for fragments of the early-Z draw call. However, stalling the pipeline may significantly reduce the performance of the pipeline. For example, in some embodiments, the pipeline may be delayed for a time determined by the fragment shades execution latency for all outstanding late-Z draw calls.

Speculative Execution

Some embodiments according to this disclosure may utilize the inventive principle that, for some combinations of depth comparison functions, correct results may be obtained even if depth tests are performed out of order for early-Z and late-Z draw calls.

For example, in some embodiments, if an older late-Z draw call and a newer early-Z draw call both implement a less-than (LT) depth comparison function, the order of the depth tests for fragments in both draw calls that correspond to the same pixel locations may not matter—that is, the final value for that pixel in the depth buffer may be the same regardless of the order of execution of the depth tests. Thus, the newer early-Z draw call may be allowed to overtake the older late-Z draw call by updating the depth buffer before the late-Z draw call (if the early-Z draw call passes the depth test).

This fragment of the early-Z draw call, which overtook the late-Z draw call, may be executed speculatively by the fragment shader. For example, in some embodiments, even though the order of the depth tests for the early-Z and late-Z draw calls may not affect the final value of the depth buffer, a correctness check may be performed to determine if the result of the early-Z depth test for the speculatively executed fragment continues to be valid after the fragments for the late-Z draw call have been executed by the fragment shader. If the result of the early-Z depth test for the speculatively executed fragment is still valid (i.e., may provide a correct result), the shader output for the speculatively executed fragment may be committed to the next stage, for example, by writing the speculative shader output to memory. Otherwise, the speculative shader output may be discarded.

Table 1 illustrates an embodiment of a compatibility matrix for depth comparison functions according to this disclosure. The depth comparison functions for an early-Z draw call are listed along the left edge of the matrix, and the depth comparison functions for a late-Z draw call are listed along the top edge of the matrix. The functions may be identified by the following abbreviations: LT=less-than; GT=greater-than; LE=less-than-or-equal-to; GE=greater-than-or-equal-to; EQ=equal-to; NE=not-equal-to; AL=always; and NV=never.

TABLE 1

|  |  | Late-Z Comparison Function | | | | | | | |
|---|---|---|---|---|---|---|---|---|---|
|  |  | LT | GT | LE | GE | EQ | NE | AL | NV |
| Early-Z | LT | 1 | 0 | 1 | 0 | 0 | 0 | 0 | 1 |
| Comparison | GT | 0 | 1 | 0 | 1 | 0 | 0 | 0 | 1 |
| Function | LE | 1 | 0 | 1 | 0 | 0 | 0 | 0 | 1 |
|  | GE | 0 | 1 | 0 | 1 | 1 | 0 | 0 | 1 |
|  | EQ | 0 | 0 | 0 | 0 | 1 | 0 | 0 | 1 |
|  | NE | 0 | 0 | 0 | 0 | 1 | 0 | 0 | 1 |
|  | AL | 1 | 1 | 1 | 1 | 1 | 1 | 1 | 1 |
|  | NV | 1 | 1 | 1 | 1 | 1 | 1 | 1 | 1 |

A one ("1") at the intersection of two comparison functions indicates that the functions may be compatible when used with the respective draw calls, whereas a zero ("0") may indicate incompatibility. In some implementations, the compatibility of comparison functions may not be reciprocal, i.e., the matrix may not be symmetric. For example, LE and EQ may be compatible when LE is used by the early-Z draw call and EQ is used by the late-Z draw call, but they may be incompatible when LE is used by the late-Z draw call and EQ is used by the early-Z draw call.

In some embodiments, the compatibility of depth comparison functions may be related to the type of correctness check performed after speculative execution of a fragment. For example, in some implementations, if the validity of the speculative shading is checked by using an "equal-to" test on the depth values before and after execution of the fragment shader as explained in more detail below, then all of the combinations of comparison functions indicated as compatible in Table 1 may be correct. However, in other implementations, if a function other than "equal to" is used for the correctness check, then some of the combinations of comparison functions indicated as being compatible in Table 1 may not be compatible, while others indicated as not being compatible may be compatible.

In some embodiments, one or more draw calls may be executed speculatively. For example, one or more early-Z draw calls may be executed speculatively (in some implementations, subject to a compatibility test of depth comparison functions) if they follow one or more late-Z draw calls that may still be outstanding in the pipeline. After all outstanding late-Z draw calls have been drained from the depth test pipeline, one or more of the speculative early-Z draw calls may switch to non-speculative execution for the portion of draw call not yet processed at the time of the late-Z draw call(s) being fully drained, and/or any newly issued early-Z draw calls may execute in non-speculative mode.

To determine if a draw call should be executed speculatively, some embodiments may track outstanding late-Z draw calls. For example, some implementations may maintain a counter for each of the depth comparison functions LT, GT, etc. All counters may initially be zero. Each time a late-Z draw call having a specific depth comparison function issues, the counter for that function may be incremented. Likewise, each time a late-Z draw call having a specific depth comparison function is completed, the counter for that function may be decremented. Thus, if all counters are zero, it may indicate that no late-Z draw calls are outstanding. If any counters are non-zero, the counter may indicate the number of outstanding late-Z draw calls that have that comparison function.

When a new early-Z draw call issues, it may execute in non-speculative mode if all eight counters are zero. If, however, one or more of the counters are non-zero, the depth comparison function of the new early-Z draw call may be checked for compatibility with the depth comparison functions of any non-zero counters. If the new early-Z draw call is compatible with all outstanding late-Z draw calls, it may execute in speculative mode. In some embodiments, however, if the depth comparison function of the new early-Z draw call is incompatible with the depth comparison function of any of the outstanding late-Z draw calls, the pipeline may be stalled until, for example, all incompatible late-Z draw calls have completed executing.

In some embodiments, when a fragment of an early-Z draw call executes speculatively due to an outstanding late-Z draw call, the depth testing may be described as a 3-way contest between the original depth value in the depth buffer, the depth value calculated for the early-Z draw call, and the depth value calculated for the late-Z draw call. However, each of the depth values may also be associated with shader results for a corresponding draw call. Thus, in some implementations, a correctness test may be implemented to ensure that the correct shader results are committed or forwarded to the next pipeline stage.

In some embodiments, when an early-Z draw call is issued in speculative mode, the comparison operation may be performed two times. A depth comparison may be performed once before issuing the fragment to the fragment shader. After the fragment shader completes execution, the depth test may be performed again (e.g., with the compare operation overridden and set to the equality operator "equal-to"), which may ensure that the result produced prior to the fragment shader execution is the same result present in the depth buffer. Some implementations may replace LT with LE, and/or GT with GE.

Some embodiments may implement a speculative buffer to track speculatively executed fragments. For example, a speculative buffer may have one bit per pixel to indicate that one or more fragments for that pixel location may be executing speculatively.

In some embodiments, the depth comparison function used by a late-Z draw call may be modified for fragments corresponding to certain pixel locations if one or more fragments are being speculatively executed for those same pixel locations. For example, in some implementations, the LT function may be replaced with LE, and the GT function may be replaced with GE in the late-Z draw call.

Some example embodiments of systems, processes, methods, and/or the like illustrating some possible implementation details according to this disclosure are described herein. These examples are provided for purposes of illustrating the principles of this disclosure, but the principles are not limited to these embodiments, implementation details, and/or the like.

Figure 2:
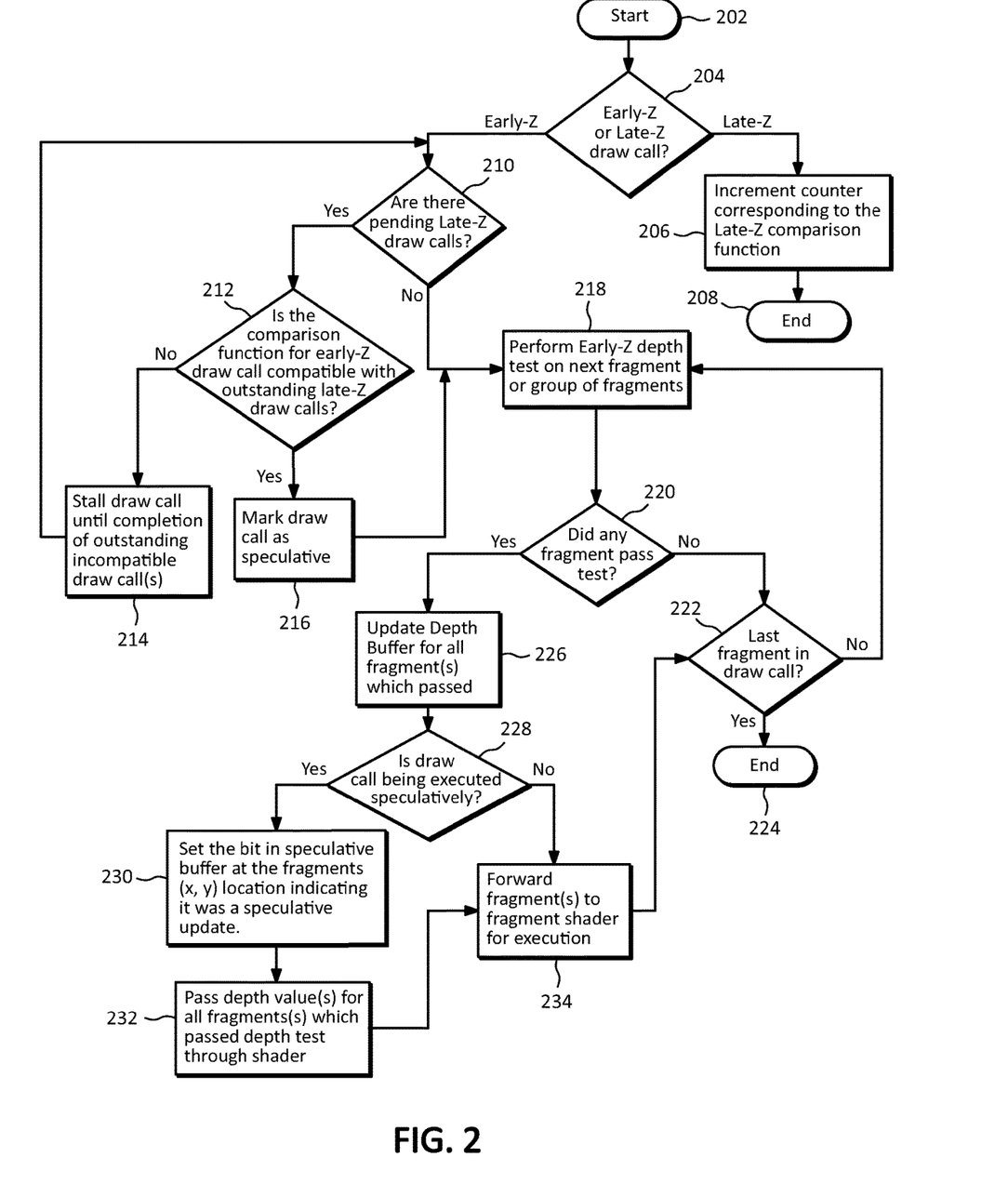
FIG. 2 illustrates an example embodiment of a method for executing an early-Z or late-Z draw call before executing a fragment shader according to this disclosure.

FIG. 2 illustrates an example embodiment of a method for executing an early-Z or late-Z draw call before executing a fragment shader according to this disclosure. The method may begin at operation 202. At operation 204, the method may determine if the draw call is an early-Z or late-Z draw call. If the draw call is a late-Z draw call, the method may proceed to operation 206 where a counter corresponding to the depth comparison function for the draw call may be incremented as described above. The method may then terminate at operation 208.

If the current draw call is an early-Z draw call, the method may proceed to operation 210 to determine if there are any outstanding late-Z draw calls. This check may be performed, for example, by checking for a non-zero state of any of the counters that may be incremented in operation 206 and/or decremented in operation 518 of FIG. 5. If there are one or more outstanding late-Z draw calls, the method may determine, at operation 212, if the depth comparison function of the current early-Z draw call is compatible with the depth comparison functions used by the outstanding late-Z draw calls. If the current early-Z draw call is not compatible with the outstanding late-Z draw calls, the current early-Z draw call may be stalled at operation 214 until all incompatible late-Z draw calls have completed executing. The method may then return to operation 210 to check for outstanding late-Z draw calls again.

Referring again to operation 212, if the depth comparison function of the current early-Z draw call is compatible with the depth comparison functions used by the outstanding late-Z draw call or calls, the current early-Z draw call may be marked as speculative at operation 216. This marking may be checked, for example, at operation 228 of FIG. 2, and operation 406 of FIG. 4. The method may then proceed to operation 218, which may also be reached by way of operation 210 if operation 210 determines that there are no outstanding late-Z draw calls, and thus the draw call may be executed non-speculatively.

At operation 218, an early-Z depth test may be performed on a fragment or group of fragments using the depth comparison function for the draw call. The method may then iterate through all remaining fragments or groups of fragments in the draw call using one of two paths. For fragments which do not pass the early-Z depth test at operation 220, the method may take a path through operation 222 which may check for the last fragment in a draw call and keep looping back to the depth test at operation 218 as long as there are remaining fragments. The method may then terminate at operation 224 after the last fragment has been processed.

For fragments which pass the early-Z depth test at operation 220, the method may take a path through operation 226 which may update the depth buffer for each fragment or group of fragments which pass the depth test. At operation 228, the method may check if the current draw call has been marked as speculative, for example, by operation 216. If the current draw call is a speculative draw call, the method may proceed to operation 230 where a bit may be set in the speculative buffer at each pixel (x, y) location for which a fragment may be speculatively executed.

At operation 232, in some embodiments, the depth buffer value for each speculative fragment may be passed through the fragment shader. This value may be used, for example, at operations 404 and 418 of FIG. 4 to determine if the depth buffer value has been changed by an intervening late-Z draw call. In other embodiments, rather than passing a depth value through the shader, a depth value may be recalculated for use at operation 418.

At operation 234, the speculatively fragments may be forwarded to the shader for speculative execution. Referring again to operation 228, if the current draw call is not a speculative draw call, the method may proceed directly to operation 234 where the fragments that passed the early-Z depth test may be forwarded to the fragment shader for non-speculative execution. The method may then return to operation 222 to determine if there are any remaining fragments to process.

Figure 3:
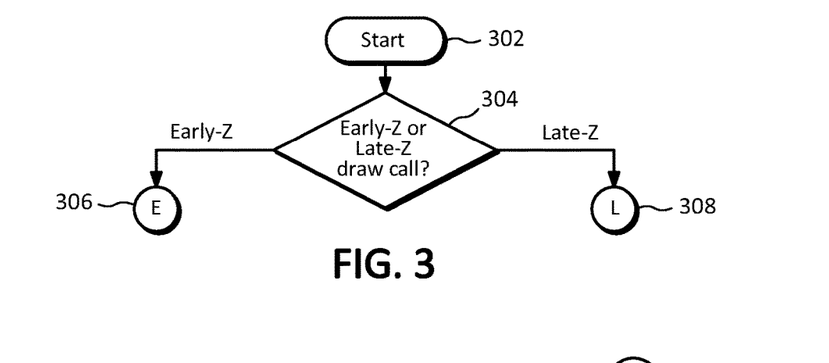
FIG. 3 illustrates an example embodiment of a method for determining a type of draw call after executing a fragment shader according to this disclosure.

FIG. 3 illustrates an example embodiment of a method for determining a type of draw call after executing a fragment shader according to this disclosure. The embodiment illustrated in FIG. 3 may begin at operation 302. At operation 304, the method may determine if the draw call is an early-Z or late-Z draw call. If the draw call is an early-Z draw call, the method may proceed through connection point 306 to connection point 402 in FIG. 4. If the draw call is a late-Z draw call, the method may proceed through connection point 308 to connection point 502 in FIG. 5.

Figure 4:
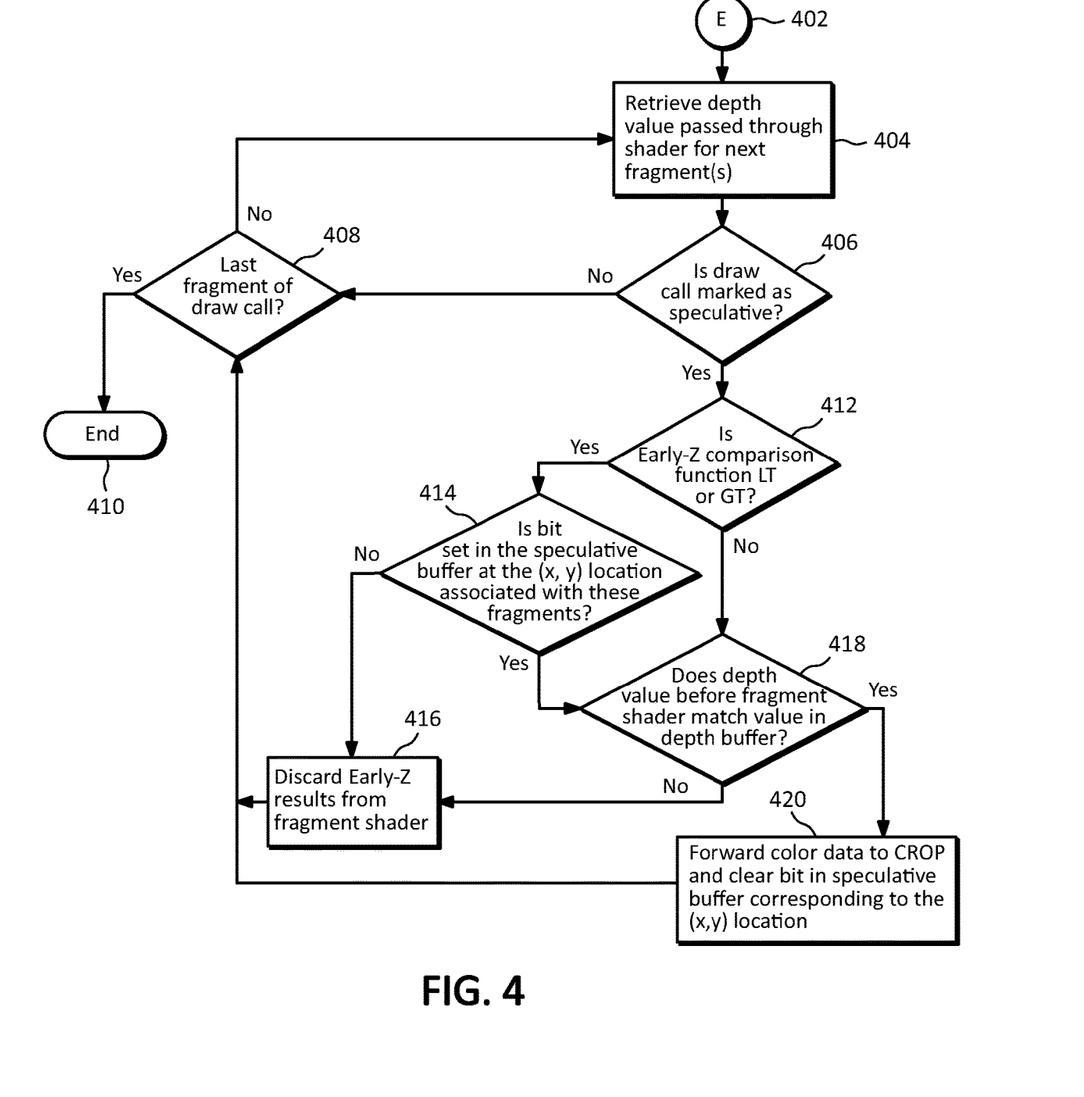
FIG. 4 illustrates an example embodiment of a method for executing an early-Z draw call after executing a fragment shader according to this disclosure.

FIG. 4 illustrates an example embodiment of a method for executing an early-Z draw call after executing a fragment shader according to this disclosure. The method may continue from FIG. 3 at connection point 402. At operation 404, the method may retrieve the depth value for a fragment which may have been passed through the fragment shader from operation 232 of FIG. 2. At operation 406, the method may determine if the current draw call was marked as speculative, for example, by operation 216 of FIG. 2. If the current draw call is not marked as speculative, the method may proceed to operation 408, where it may continue looping back through operations 404 and 406 until the last fragment is detected. The method may then terminate at operation 410.

At operation 406, if the current draw call is marked as speculative, the depth comparison function of the draw call may be checked at operation 412. If the depth comparison function is LT or GT, and the method may proceed to operation 414, where the state of the bit in the speculative buffer corresponding to the (x, y) location of the fragment is checked. If the bit is clear, it may indicate that the bit was cleared, for example, in operation 526 of FIG. 5 after sending the fragment data to the color raster operation unit (CROP) at operation 522, and therefore, the speculative results from the fragment may be discarded at operation 416.

At operation 412, if the depth comparison function is not LT or GT, the method may proceed to operation 418. The method may also reach operation 418 if, at operation 414, the bit in the speculative buffer corresponding to the (x, y) location of the fragment is set.

At operation 418, the current value of the depth buffer for the fragment is compared to the value of the depth value of the fragment before the fragment shader execution, i.e., the value saved at operation 232 in FIG. 2. If the values are the same ("equal-to"), it may indicate that the value of the depth buffer was not changed by a late-Z draw call, and the shader output for the current speculatively executed fragment may be forwarded to the CROP at operation 420. Also at operation 420, the bit in the speculative buffer corresponding to the (x, y) location may be cleared. If, however, at operation 418, the current value of the depth buffer for the fragment is not equal to the value of the depth value of the fragment before the fragment shader execution, it may indicate that the value of the depth buffer was changed by a late-Z draw call for a fragment located at the same pixel location, and the shader output for the current speculatively executed fragment may be discarded at operation 416. The method may then return to operation 408. In some embodiments, the operations 412, 414, and 418 may be considered a correctness test.

Figure 5:
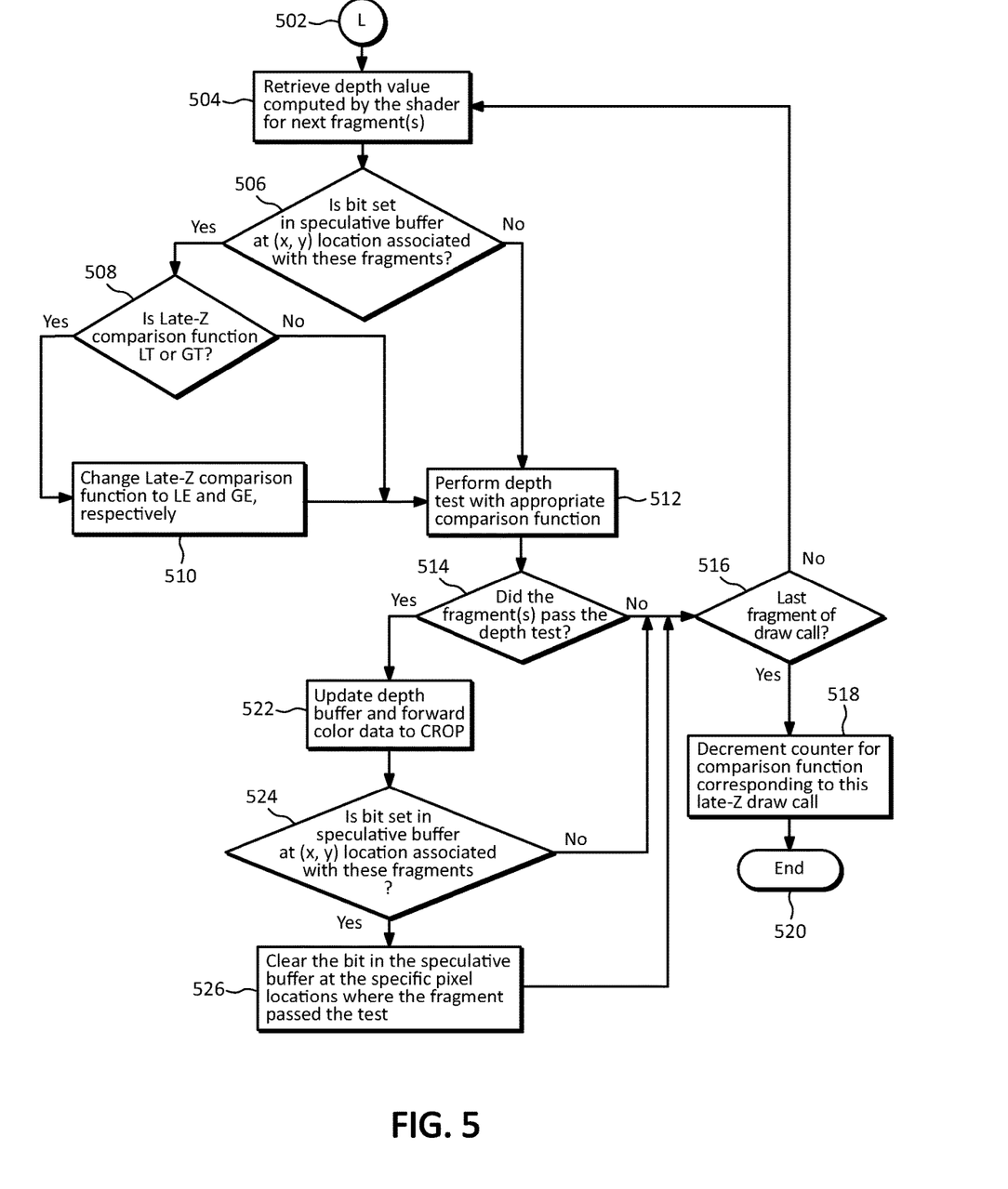
FIG. 5 illustrates an example embodiment of a method for executing a late-Z draw call after executing a fragment shader according to this disclosure.

FIG. 5 illustrates an example embodiment of a method for executing a late-Z draw call after executing a fragment shader according to this disclosure. The method may continue from FIG. 3 at connection point 502. At operation 504, the method may retrieve the depth value computed by the shader for the next fragment or fragments. At operation 506, the method may check the state of the bit or bits in the speculative buffer corresponding to the (x, y) location of the current fragment or fragments. If no bits corresponding to the (x, y) location of the current fragment(s) in the speculative buffer are set, the method may proceed directly to depth testing at operation 512. If one or more of the bits are set, which may indicate that a fragment corresponding to the same pixel location may be speculatively executed by an early-Z draw call, the method may proceed to operation 508, where the depth comparison function for the current draw call is checked. If the comparison function for the current draw call is LT or GT, the method may change the comparison function to include "equal-to" and proceed to operation 512. However, if at operation 508 the comparison function is not LT or GT, the method may proceed to operation 512.

At operation 512, a late-Z depth test is performed using the depth comparison function (which may have been modified at operation 510). At operation 514, if the fragment or fragments failed the depth test, the method may proceed to operation 516, which may determine if the last fragment or fragments have been processed. If the last fragment has been processed, the counter corresponding to the depth comparison function for the current late-Z draw call may be decremented at operation 518, and the method may terminate at operation 520.

At operation 514, if the fragment or fragments passed the depth test, the method may proceed to operation 522 where the depth buffer may be updated using the value used by the late-Z depth test. The bit or bits in the speculative buffer corresponding to the (x, y) location of the current fragment or fragments may then be cleared at operation 526 if it or they were determined to be set at operation 524. The method may then return to operation 516 to continue processing more fragments until the final fragment has been processed.

Speculative Buffer

For purposes of illustration, some example implementation details for one or more speculative buffers may be provided below. However, the inventive principles are not limited to these embodiments, implementation details, and/or the like.

In some embodiments, a speculative buffer for a tile-based system such as a tile-based deferred rendering (TBDR) pipeline may be implemented, for example, by providing one bit for each unique fragment. Since the maximum tile size and number of tiles may be known at the time of design, a speculative buffer may be sized appropriately. For example, if a GPU pipeline has a maximum tile size of 64×64 and a maximum of three outstanding tiles, the buffer may be implemented with 4K×3=12K bits. In some embodiments, all bits in the speculative buffer may be initialized to zero (indicating non-speculative), for example, at reset and/or startup.

In some embodiments, a speculative buffer may be implemented, for example, using a cache-like structure. A cache may be implemented in any suitable manner, for example, to allow multiple pixel locations with the same index to be active at the same time.

In some example implementations, a speculative buffer may be implemented, for example, using a standalone cache which may hold one bit of data indicating whether the data at a specific pixel location was written to the depth buffer speculatively. The cache is indexed by the pixel location. Some bits from the binary representation of the pixel location may be used to index into the cache, and the remaining bits may be used as a tag. The tag may be compared with the tag at the indexed pixel location, and if they match, the data (if present) in the cache may correspond to the pixel.

In some embodiments, for example, an immediate mode rendering (IMR) embodiment, a speculative buffer may be implemented with, and/or appended to, an existing logical depth buffer cache structure, and therefore may involve little or no additional hardware. Depending on the implementation details, this may reduce the time, complexity, expense, and/or the like, of implementing a speculative buffer. In some embodiments implementing such a technique, one or more speculative bits may be flushed to bits in main memory.

Pixel-Based Tracking

Some embodiments according to this disclosure may utilize the inventive principle that the order of execution of depth tests and/or fragment shading may only affect correctness for fragments at the same pixel location. Depth tests and/or shading for fragments at different pixel locations may be executed out of order regardless of the type of draw call (e.g., early-Z, late-Z) and/or depth comparison function of the draw calls to which the fragments belong.

For example, some embodiments may implement a data structure that may track, or attempt to track, each pixel for which there may be one or more fragments in a pipeline. Pixels may be tracked, for example, using a scoreboard data structure which may index data by pixel location, e.g., (x, y) location. The scoreboard may initially be empty. When a first draw call enters the pipeline, an entry may be created in the scoreboard for each pixel for which there is a corresponding fragment in the draw call. The data stored in each entry may include, for example, an identifier of the type of draw call (e.g., early-Z or late-Z) and/or an identifier of the depth comparison function used by the draw call (e.g., LT, GT, LE, GE, etc.). All fragments in the first draw call may begin executing because there may be no other draw calls, and therefore, no conflicts between fragments of different draw calls. The scoreboard entry for each fragment in the draw call may be deleted from the scoreboard as the fragment completes execution.

When a second draw call enters the pipeline, an entry may be created in the scoreboard for each pixel for which there is a corresponding fragment in the second draw call, again, using the (x, y) position as an index into the data structure. Any fragments in the second draw call that do not overlap with fragments at the same pixel locations in the first draw call may proceed (e.g., immediately) through the pipeline. For any fragments in the second draw call that occupy the same pixel locations as fragments in the first draw call that are still in flight (still executing), various compatibility criteria may be used to determine which fragments at the same pixel locations, if any, may be allowed to execute, and in what order.

For example, in some implementations, compatibility may be determined based on the type of draw call. That is, all fragments of early-Z draw calls may be compatible with each other, and all fragments of late-Z draw calls may be compatible with each other. Thus, if the both fragments at a pixel location belong to the same type of draw call, they may both proceed. Otherwise, the later arriving fragment may be stalled while e earlier arriving fragment proceeds.

In some embodiments, any number of fragments of any number of draw calls may be added to the scoreboard data structure for each pixel location.

In some embodiments, per-pixel tracking may be combined with speculative execution as described above. For example, if a fragment of an early-Z draw call arrives at a pixel location that already has an outstanding fragment of a late-Z draw call, the compatibility of the depth comparison functions may be evaluated, for example, using a compatibility matrix such as the one illustrated in Table 1. If the depth comparison functions are compatible, the later arriving early-Z fragment may be depth tested and/or speculatively executed in a manner similar to that described above for draw-call based tracking. Such an implementation may include, for example, a post-shading correctness check similar to those described above to determine whether the shading data for the late-Z fragment or the early-Z fragment may be committed to the next pipeline stage. If, however, the depth comparison functions of the early-Z and late-Z fragments are not compatible, the later arriving early-Z fragment may be stalled until the outstanding late-Z fragment is completed. Moreover, in some embodiments, any subsequent fragments arriving at the same pixel location after the early-Z fragment arrived may be stalled until the late-Z fragment is completed (or any incompatible fragments are completed), even if the depth comparison functions of the subsequent fragments may be compatible with that of the outstanding late-Z fragment.

In some embodiments, and depending on the implementation details, a per-pixel tracking technique such as that described above may enable fragments from multiple compatible draw calls to be in flight simultaneously.

In some embodiments, the scoreboard data structure may be implemented, for example, with a fixed size data structure. For example, in a tile-based implementation, the size of the data structure may be determined by multiplying the number of tile elements (e.g., 4K for a 64×64 tile) times the number of bits used for each entry (e.g., one bit to determine early-Z or late-Z and three bits to determine one of the eight types of depth comparison function) times an average number of entries for each pixel location.

Alternatively, in some embodiments, for example for an IMR architecture, a scoreboard data structure may be implemented using a cache-like data structure. In such a structure, for example, a hashing mechanism may be utilized in which the last few bits of each of the x- and y-coordinates may be concatenated and used as an index into the cache. Each cache entry may include, for example, the complete x- and y-coordinates for the fragment, the draw call type for the fragment, and/or the depth comparison function of the fragment. In some implementations, the cache may be arranged as an n-way associative cache to facilitate pushing multiple entries into the cache.

Figure 6:
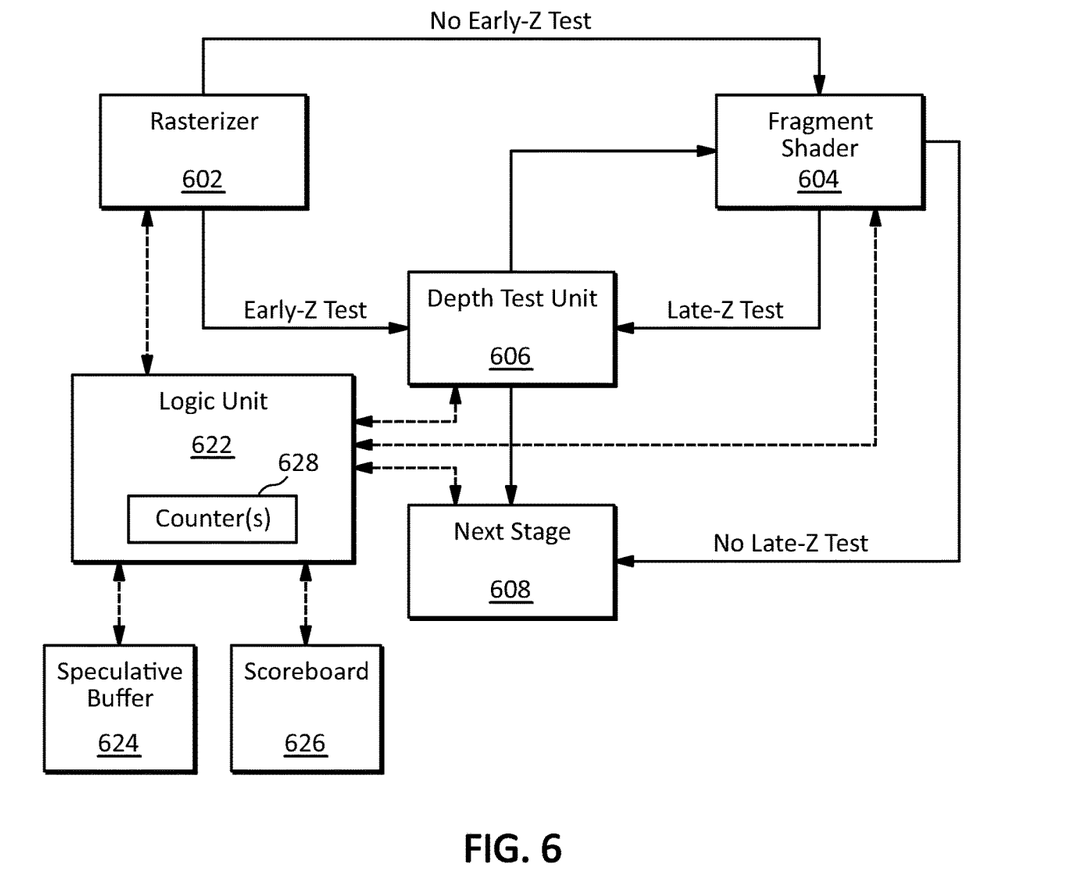
FIG. 6 illustrates an embodiment of a GPU pipeline according to this disclosure.

FIG. 6 illustrates an embodiment of a GPU pipeline according to this disclosure. The embodiment illustrated in FIG. 6 may include some components similar to those illustrated in the embodiment illustrated in FIG. 1. The embodiment illustrated in FIG. 6, however, may further include a logic unit 622 which may implement any of the functionality described in this disclosure. For example, the logic unit 622 may include logic to control the operation of, and/or data flow between, the rasterizer 602, shader 604, depth test unit 606, next stage 608 (which may be implemented, for example, as a raster operation unit (ROP)), as well as a speculative buffer 624, a scoreboard data structure 626, one or more counters 628, and/or the like.

In some implementations, the logic unit 622 may, alone or in combination with other components: detect draw calls in the pipeline, determine compatibility of a depth comparison function, speculatively execute fragment shading, update a depth buffer, determine whether the result of an early-Z depth test may provide a correct result, and/or the like. In some implementations, the one or more counters 628 may be used, for example, to track outstanding late-Z draw calls in the pipeline based on their depth comparison functions.

Any of the components illustrated in FIG. 6 may be implemented with hardware, software and/or any combination thereof. Although the components illustrated in FIG. 6 may be shown as distinct components, in some embodiments, any or all of the components may be integrated with, and/or distributed between, any of the components illustrated in FIG. 6 and/or any other components in a system in which it is implemented.

Figure 7:
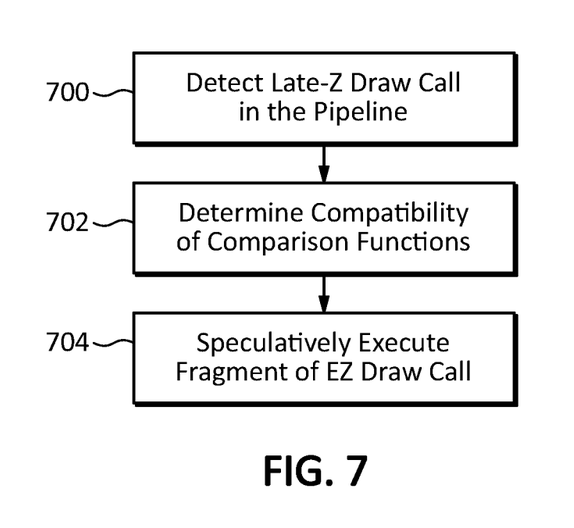
FIG. 7 illustrates an example embodiment of a method for speculatively executing an early-Z draw call in a graphics processing pipeline according to this disclosure.

FIG. 7 illustrates an example embodiment of a method for speculatively executing an early-Z draw call in a graphics processing pipeline according to this disclosure. The method may begin at operation 700 with detecting a late-Z draw call in the pipeline. At operation 702, the method may determine the compatibility of a depth comparison function of the early-Z draw call with a depth comparison function of the late-Z draw call. At operation 704, the method may speculatively execute a fragment of the early-Z draw call with a shader.

Figure 8:
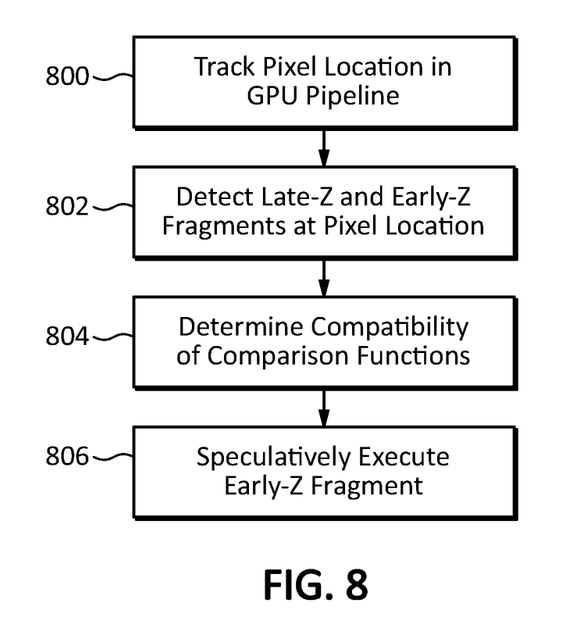
FIG. 8 illustrates an example embodiment of a method for per-pixel tracking for speculatively executing a fragment of an early-Z draw call according to this disclosure.

FIG. 8 illustrates an example embodiment of a method for per-pixel tracking for speculatively executing a fragment of an early-Z draw call according to this disclosure. The method may begin at operation 800 with tracking a pixel location in a graphics processing pipeline. At operation 802, the method may detect an early-Z fragment and a late-Z fragment for the pixel location. At operation 804, the method may determine the compatibility of a depth comparison function of the early-Z fragment with a depth comparison function of the late-Z fragment. At operation 806, the method may speculatively execute the early-Z fragment for the pixel location with a shader.

The operations and/or components described with respect to the embodiment illustrated in FIGS. 7 and 8, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

Although some embodiments may be described in the context of hardware implementations, any or all of the inventive principles disclosed herein may be implemented, in software and/or any combination of hardware, software, firmware, etc.

Figure 9:
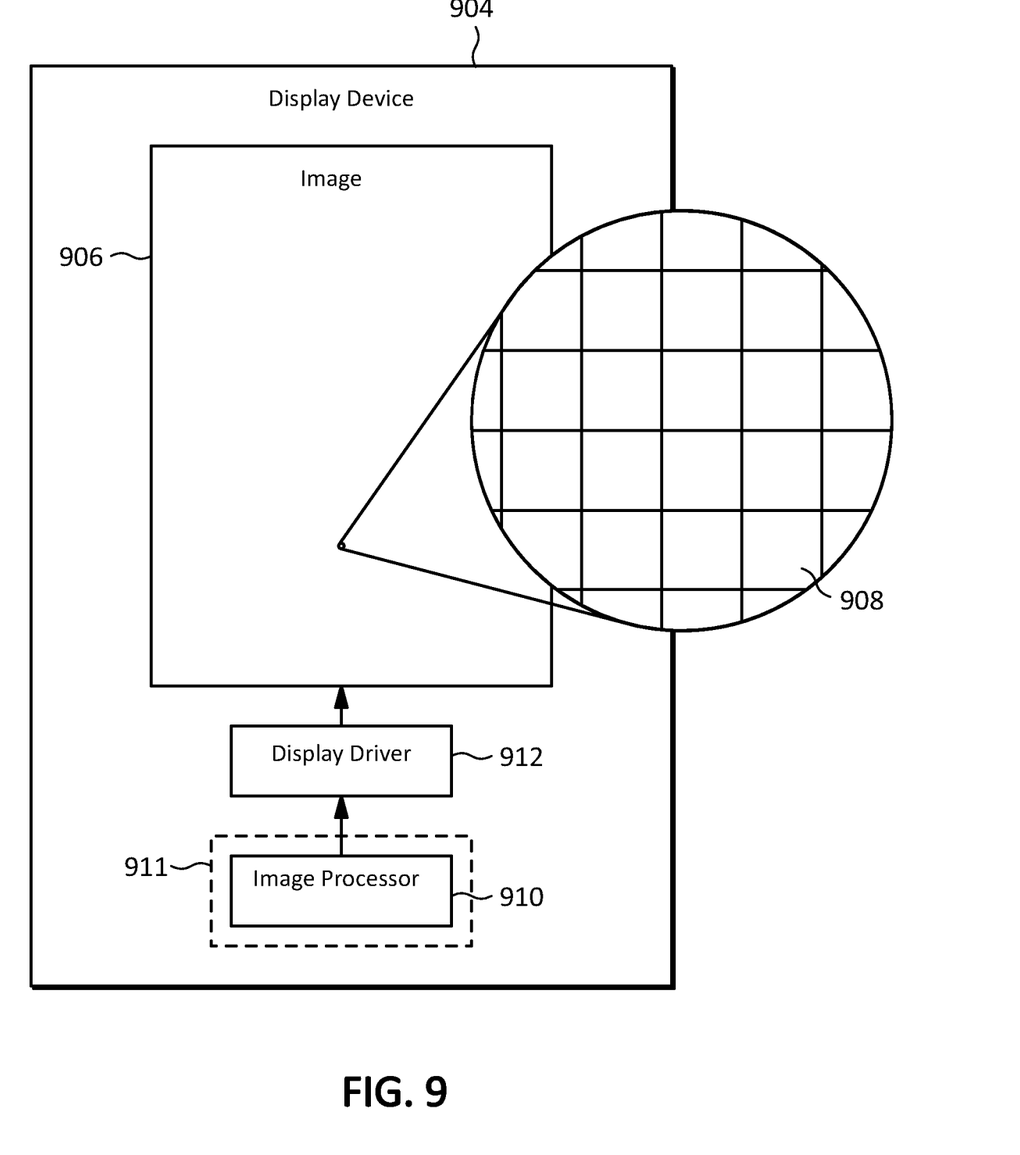
FIG. 9 illustrates an embodiment of an image display device which may incorporate any of the methods or apparatus described in this disclosure.

FIG. 9 illustrates an embodiment of an image display device 904 into which any of the methods or apparatus described in this disclosure may be integrated. The display device 904 may have any form factor such as a panel display for a PC, laptop, mobile device, etc., a projector, VR goggles, etc., and may be based on any imaging technology such as cathode ray tube (CRT), digital light projector (DLP), light emitting diode (LED), liquid crystal display (LCD), organic LED (OLED), quantum dot, etc., for displaying a rasterized image 906 with pixels. An image processor 910 such as graphics processing unit (GPU) and/or driver circuit 912 may process and/or convert the image to a form that may be displayed on or through the imaging device 904. A portion of the image 906 is shown enlarged so pixels 908 are visible. Any of the methods or apparatus described in this disclosure may be integrated into the imaging device 904, processor 910, and/or display driver circuit 912 to generate pixels 908 shown in 9, and/or groups thereof. In some embodiments, the image processor 910 may include a pipeline that may implement speculative execution, draw call based tracking, compatibility testing, per-pixel tracking, and/or any of the other inventive principles described herein, implemented, for example, on an integrated circuit 911. In some embodiments, the integrated circuit 911 may also include the driver circuit 912 and/or any other components that may implement any other functionality of the display device 904.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element.

The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method of executing an early-Z draw call in a graphics processing pipeline, the method comprising:
    detecting a late-Z draw call in the pipeline, wherein the late-Z draw call includes a fragment, for a location in an image, that provides a color or texture result;
    determining a compatibility of a depth comparison function of the early-Z draw call with a depth comparison function of the late-Z draw call;
    speculatively executing a fragment, for the location in the image, of the early-Z draw call with a shader based on the compatibility; and
    forwarding, to a subsequent stage of the pipeline, a color or texture result of speculatively executing the fragment of the early-Z draw call.

2. The method of claim 1, further comprising:
    determining that the fragment passes the depth comparison function of the early-Z draw call; and
    updating a depth buffer with a depth value for the fragment of the early-Z draw call.

3. The method of claim 2, further comprising:
    determining that the fragment of the early-Z draw call provides a correct result.

4. The method of claim 3, wherein determining that the fragment of the early-Z draw call provides a correct result comprises comparing the depth value for the fragment of the early-Z draw call with a depth value of a corresponding fragment of the late-Z draw call.

5. The method of claim 2, further comprising tracking the fragment of the early-Z draw call with a speculative buffer.

6. The method of claim 5, further comprising determining that the fragment of the early-Z draw call has been speculatively executed.

7. The method of claim 6, further comprising adjusting the depth comparison function of the late-Z draw call.

8. The method of claim 7, further comprising determining that the depth comparison function of the late-Z draw call comprises less-than or greater-than.

9. The method of claim 8, further comprising modifying the depth comparison function of the late-Z draw call to include equal-to.

10. The method of claim 1, wherein detecting the late-Z draw call in the pipeline comprises tracking one or more outstanding late-Z draw calls.

11. The method of claim 9, wherein the one or more outstanding late-Z draw calls are tracked by depth comparison functions.

12. A method comprising:
    tracking a pixel location in a graphics processing pipeline;
    detecting an early-Z fragment and a late-Z fragment for the pixel location, wherein the late-Z fragment provides a color or texture result for the pixel location;

determining a compatibility of a depth comparison function of the early-Z fragment with a depth comparison function of the late-Z fragment;
speculatively executing the early-Z fragment for the pixel location with a shader based on the compatibility; and
forwarding, to a subsequent stage of the pipeline, a color or texture result of speculatively executing the early-Z fragment for the pixel location.

13. The method of claim 12, wherein the pixel location is tracked with a scoreboard that stores a draw call type and a depth comparison function for one or more fragments at the pixel location.

14. The method of claim 13, wherein the scoreboard comprises a cache-like structure.

15. The method of claim 14, wherein entries in the cache-like structure are indexed by one or more pixel coordinates.

16. The method of claim 12, further comprising:
determining that the early-Z fragment passes the depth comparison function of the early-Z fragment; and
updating a depth buffer with a depth value for the early-Z fragment.

17. The method of claim 16, further comprising:
determining that the early-Z fragment provides a correct result.

18. A graphics processing unit comprising a pipeline comprising:
a shader unit;
a depth test unit arranged to receive data from a rasterizer and the shader unit and send data to the shader unit and a subsequent stage of the pipeline; and
a logic unit coupled to the shader unit and the depth test unit and configured to:
detect an early-Z draw call and a late-Z draw call in the pipeline, wherein the late-Z draw call includes a fragment, for a location in an image, that provides a color or texture result;
determine a compatibility of a depth comparison function of the early-Z draw call with a depth comparison function of the late-Z draw call;
control the shader unit to speculatively execute a fragment, for the location in the image, of the early-Z draw call based on the compatibility; and
forward, to the subsequent stage of the pipeline, a color or texture result of speculatively executing the fragment of the early-Z draw call.

19. The graphics processing unit of claim 18, further comprising a speculative buffer configured to track one or more pixels having speculatively executed fragments.

20. The graphics processing unit of claim 18, further comprising a scoreboard configured to store a draw call type and a depth comparison function for one or more draw calls for a pixel.

21. The graphics processing unit of claim 18, wherein the logic unit is further configured to:
control the depth test unit to determine that the fragment of the early-Z draw call passes the depth comparison function of the early-Z draw call; and
update a depth buffer with a depth value for the fragment of the early-Z draw call.

22. The graphics processing unit of claim 21, wherein the logic unit is further configured to:
determine that the fragment of the early-Z draw call provides a correct result.

* * * * *